United States Patent
Lucas et al.

(10) Patent No.: US 11,156,980 B2
(45) Date of Patent: Oct. 26, 2021

(54) METHOD AND DEVICE FOR OPTIMIZING A GLASS CUTTING PLAN BY A GUILLOTINE CUTTER

(71) Applicant: SAINT-GOBAIN GLASS FRANCE, Courbevoie (FR)

(72) Inventors: Claire Lucas, Paris (FR); Francois Sausset, Montrouge (FR); Lydia Tlilane, Paris (FR)

(73) Assignee: SAINT-GOBAIN GLASS FRANCE, Courbevoie (FR)

(*) Notice: Subject to any disclaimer, the term of this patent is extended or adjusted under 35 U.S.C. 154(b) by 0 days.

(21) Appl. No.: 16/327,568

(22) PCT Filed: Sep. 7, 2017

(86) PCT No.: PCT/FR2017/052382
§ 371 (c)(1),
(2) Date: Feb. 22, 2019

(87) PCT Pub. No.: WO2018/046861
PCT Pub. Date: Mar. 15, 2018

(65) Prior Publication Data
US 2019/0227514 A1    Jul. 25, 2019

(30) Foreign Application Priority Data

Sep. 7, 2016 (FR) ....................................... 1658315

(51) Int. Cl.
*G05B 19/402* (2006.01)
*G05B 19/18* (2006.01)
(Continued)

(52) U.S. Cl.
CPC .......... *G05B 19/182* (2013.01); *C03B 33/037* (2013.01); *C03B 33/10* (2013.01);
(Continued)

(58) Field of Classification Search
CPC .............. G05B 19/182; G05B 19/402; G05B 2219/36086; G06F 30/00; G06F 2219/18;
(Continued)

(56) References Cited

U.S. PATENT DOCUMENTS 5,119,854 A * 6/1992 Chanoine ............. A47F 7/0042
                                                   144/1.1
5,148,924 A * 9/1992 Mason ................. B65G 49/062
                                                   206/451
(Continued)

OTHER PUBLICATIONS

International Search Report dated Nov. 29, 2017 in PCT/FR2017/052382, 3 pages.
(Continued)

*Primary Examiner* — Kenneth M Lo
*Assistant Examiner* — Michael W Choi
(74) *Attorney, Agent, or Firm* — Oblon, McClelland, Maier & Neustadt, L.L.P.

(57) ABSTRACT

A method determines an optimized cutting plan for using a guillotine to cut a batch of rectangular pieces of glass out from at least one sheet of glass. The method includes initializing including defining cutting constraints and positioning constraints for the pieces together with an optimization criterion; creating a tree comprising a root, leaves, each presenting a complete cutting plan enabling all of the pieces of the batch to be cut out, the cutting plan associated with a node of the tree being obtained by adding to the partial cutting plan associated with the parent node of the node, and in compliance with the constraints, the next piece for the frame determined in compliance with the sequence predetermined for the frame; and selecting a complete cutting plan associated with a leaf of the tree as a function of the optimization criterion.

16 Claims, 8 Drawing Sheets

(51) Int. Cl.
*C03B 33/037* (2006.01)
*G06Q 10/04* (2012.01)
*G06Q 50/04* (2012.01)
*G06F 30/00* (2020.01)
*C03B 33/10* (2006.01)
*G06F 119/18* (2020.01)

(52) U.S. Cl.
CPC ........... *G05B 19/402* (2013.01); *G06F 30/00* (2020.01); *G06Q 10/043* (2013.01); *G06Q 50/04* (2013.01); *G05B 2219/36086* (2013.01); *G06F 2119/18* (2020.01); *Y02P 90/02* (2015.11); *Y02P 90/30* (2015.11)

(58) Field of Classification Search
CPC .... C03B 33/037; C03B 33/10; G06Q 10/043; G06Q 50/04; Y02P 90/265; Y02P 90/30
USPC .......................................................... 700/117
See application file for complete search history.

(56) References Cited

U.S. PATENT DOCUMENTS

| | | | |
|---|---|---|---|
| 2005/0012961 A1* | 1/2005 | Holt | G06Q 10/043 358/1.18 |
| 2010/0070066 A1* | 3/2010 | Wirsam | C03B 33/037 700/106 |
| 2015/0375415 A1* | 12/2015 | Sausset | G05B 19/182 83/34 |

OTHER PUBLICATIONS

Wang, P.Y., "Two Algorithms for Constrained Two-Dimensional Cutting Stock Problems", Operations Research., vol. 31, No. 3, XP055375824, Jun. 1, 1983 (Jun. 1, 1983), pp. 573-586.

Puchinger, J., et al., "Solving a Real-World Glass Cutting Problem", Mar. 9, 2004, Evolutionary Computation in Combinatorial Optimization; [Lecture Notes in Computer Science;;LNCS], Springer-Verlag, XP019003851, pp. 165-176.

Hadjisconstantinou, E., et al., "An exact algorithm for general, orthogonal, two-dimensional knapsack problems", European Journal of Operational Research, vol. 83, No. 1, May 18, 1995 (May 18, 1995), XP002050596, pp. 39-56.

Jylänki, J., "A Thousand Ways to Pack the Bin—A Practical Approach to Two-Dimensional Rectangle Bin Packing", Feb. 27, 2010 (Feb. 27, 2010), XP055377189, Retrieved from the Internet; URL: http://clb.demon.fi/files/RectangleBinPack.pdf; [retrieved on May 30, 2017], pp. 1-50.

Christofides, N., et al., "An Algorithm for Two-Dimensional Cutting Problems", Operations Research, vol. 25, No. 1, Jan. 1, 1977 (Jan. 1, 1977), pp. 30-44, XP000606825.

Anonymous, "Tree (data structure)"—Wikipedia, the free encyclopedia ", Aug. 7, 2016 (Aug. 7, 2016), XP055300500, Retrieved from the Internet; URL: https://en.wikipedia.org/w/index.php?title=Tree_(data_structure)&printable=yes> [retrieved on Sep. 7, 2016], pp. 1-9.

* cited by examiner

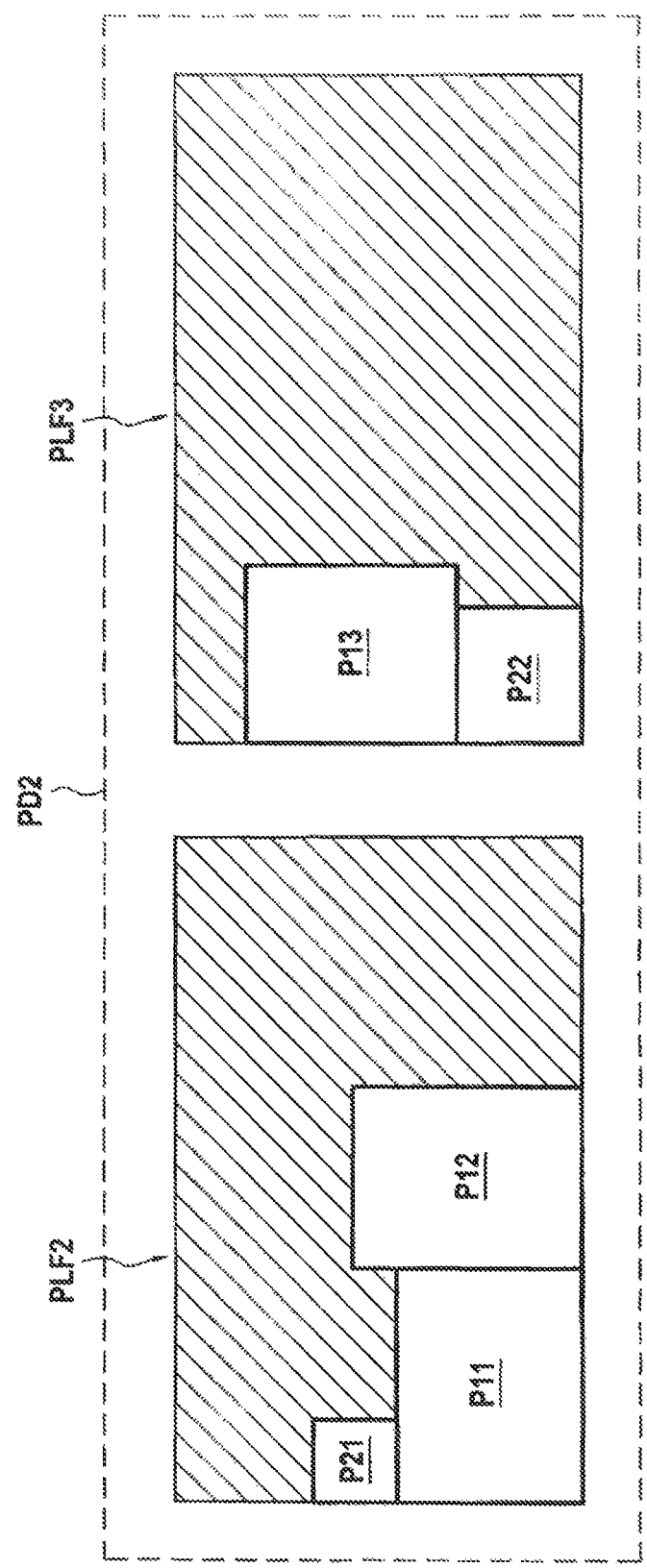

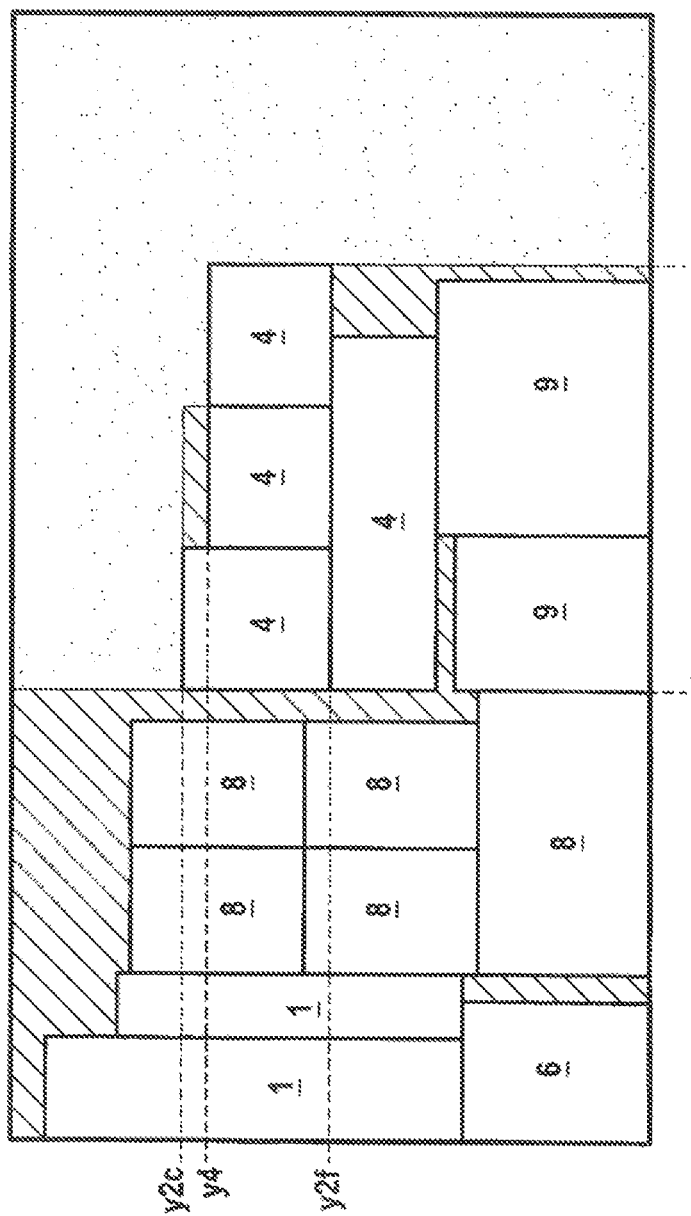

METHOD AND DEVICE FOR OPTIMIZING A GLASS CUTTING PLAN BY A GUILLOTINE CUTTER

BACKGROUND OF THE INVENTION

The present invention lies in the field of methods of cutting glass, and it relates more particularly to a method and to a device for optimizing such cuttings.

The method and the method of the invention serve in particular to reduce losses of glass when creating batches for cutting in a factory.

It should be recalled that a plan for cutting a batch of rectangular pieces of glass by guillotine needs to take account of the fact that the pieces are for stacking on one or more frames, in a predetermined sequence that is specific to each frame.

In the present state of the art, there does not exist any software for optimizing the design of a cutting plan and capable of complying with placing constraints, while minimizing losses of glass.

Specifically, the software used at present for this purpose is capable of constructing only a limited number of cutting plans that comply with placement constraints, thus making it necessary in practice for the operator to use a plurality of pieces of software in parallel, and then to select from among the cutting plans generated by those various pieces of software, the plan that minimizes losses of glass.

The document "An exact algorithm for general, orthogonal, two-dimensional knapsack problems, European Journal of Operational Research, Vol. 83, No. 1, May 18, 1995, Hadjisconstantinou et al.)" describes a method of cutting pieces from a single sheet. That method is not applicable to a method of cutting by guillotine in which the pieces may be of dimensions that are very different, the pieces possibly being for stacking on a plurality of frames with a predefined sequence for each frame.

OBJECT AND SUMMARY OF THE INVENTION

The invention seeks to provide a method and a device for determining a cutting plan that does not present the above-mentioned drawbacks.

More precisely, and in a first aspect, the invention provides a method performed by computer to determine an optimized cutting plan for using a guillotine to cut a batch of rectangular pieces of glass out from at least one sheet of glass, the pieces, once cut out, being for stacking on one or more frames, the pieces for any one frame being for placing on a sheet that is to be cut up in a sequence that is predetermined for that frame, said method comprising:
  an initialization step for defining cutting constraints and positioning constraints for said pieces together with an optimization criterion;
  creating a tree comprising a root, leaves, each presenting a complete cutting plan enabling all of the pieces of the batch to be cut out, each other node of the tree representing a partial cutting plan, the cutting plan associated with a node of the tree being obtained by adding to the partial cutting plan associated with the parent node of said node, and in compliance with predetermined constraints, the next piece for a said frame determined in compliance with the sequence predetermined for the frame; and
  a selection step for selecting a complete cutting plan associated with a leaf of the tree as a function of said optimization criterion.

The invention has a preferred application when the pieces are for stacking on at least two frames, with a predefined sequence for each frame.

The invention also has a preferred application when using at least two sheets of glass.

Thus, and in general manner, the invention seeks to provide a method making it possible to devise a large number of complete cutting plans, including for batches that are complex. The method is remarkable in that it constructs a tree of partial cutting plans progressively by placing the pieces one by one in compliance with constraints.

In accordance with the invention, the pieces of partial and of complete cutting plans have the dimensions of the pieces that are indeed to be stacked on the frames; each complete cutting plan having exactly the number of pieces required for all of the frames. This constitutes a fundamental difference compared with the method described in the document by Hadjisconstantinou et al., which that allows for cutting out a number of pieces that varies in compliance with a predefined limit.

It is usual practice for the person skilled in the art of trees to make use of the concept of a "level". The root constitutes the first level of the tree, the child nodes of the root constitute the second level of the tree, the child nodes of those child nodes constitute the third level of the tree, etc.

This method also presents the advantage of being easy to perform in parallel.

The method greatly facilitates the task of the operator, which consists essentially in inputting constraints and the optimization criterion.

The optimization criterion may seek to minimize a total area lost as a result of the cutting. In a variant, the operator may define some other optimization criterion, e.g. minimizing the number of sheets of glass that are used.

In a particular implementation, the cutting constraints may be selected from among:
  a maximum number of cutting levels;
  a minimum width of scrap, e.g. greater than twice the thickness of the sheet;
  a direction for the first break, e.g. in the width direction of the sheet, or the maximum width of a cutting level, e.g. three meters, because of handling constraints.

It should be observed that it is important not to confuse the concepts of "level in the tree" and of "cutting level", which are completely independent.

In a particular implementation, the positioning constraints may be selected from among the orientations of the pieces in a sheet, the relative positions of the pieces in a single sheet as a function of their level, the maximum number of said at least one sheet of glass.

In a particular implementation, a node of the tree possesses a maximum of 9.m child nodes, where m is the number of frames. Specifically, for each frame, a new piece selected in compliance with the positioning constraints may be added to a partial cutting plan and this can be done in nine different manners, namely:
  to the right of the preceding piece (in a cutting level 3), and either horizontally or vertically;
  above the preceding piece if these last two pieces have the same width (in a new cutting level 4), a single position suffices among horizontal and vertical, namely the position of width that is equal to the width of the preceding piece;
  above the preceding piece, at the left end of the current breadth (in a new cutting level 2), either horizontally or vertically;

in a new breadth (in a new cutting level 1), either horizontally or vertically; and in a new sheet, either horizontally or vertically.

In an optimized variant implementation, the creation of the tree comprises:

a step consisting in creating, under the root and for each of the frames, a node associated with a partial cutting plan for each of the acceptable positions of the first piece of the frame while complying with said constraints; and at least one iteration, each iteration comprising:

a selection step for selecting a current node of the tree as a function of characteristics of the partial cutting plan represented by that node; and a creation step for creating at least one child node of said current node, the cutting plan associated with said child node being obtained by adding to the partial cutting plan associated with said current node, and in compliance with the constraints, the next piece for a frame taken in accordance with the sequence predetermined for that frame.

This variant is remarkable in that it comprises, on each iteration, a step of selecting the current node for which child nodes are to be created as a function of the characteristics of the partial cutting plan represented by this node.

This characteristic makes it possible to select the current node that is the most promising for reaching the optimum solution, such that the method normally reaches the optimum solution more quickly.

It is therefore advantageous, in a particular implementation, for the method to include a step of stopping the iterations if the duration of execution of the method is greater than a predefined duration so as to enable the operator to take cognizance of an optimized solution or of a good solution within a reasonable length of time.

In a particular implementation, the method enables the user to have knowledge of the best solution at any time, while allowing the method to continue executing, potentially discovering better solutions.

In a particular implementation, the current node is selected:

in compliance with a first criterion referred to as the "minimum scrap criterion" consisting in selecting the node associated with the cutting plan having the smallest ratio of the area lost divided by useful area; or in compliance with a second criterion referred to as the "maximum area criterion" consisting in selecting the node associated with the cutting plan having the largest useful area.

This strategy of exploring the tree, in other words of selecting the current node, consists in alternating between the two criteria of "minimum scrap" and of "maximum area".

For example, the "minimum scrap criterion" may be used during a defined length of time or else during a predetermined number of iterations or else until a certain fraction of the RAM of the computer is occupied (about two million nodes open).

Applying the "minimum scrap" criterion makes it possible to explore promising regions of the tree in which the partial plans that are created have minimum scrap and can lead to complete cutting plans that are close to the optimum solution. Nevertheless, applying this criterion leads to a plurality of new nodes being created, and if no limit is set, that runs the risk of saturating the memory of the machine.

Thus, advantageously, in this implementation of the invention, when the above-mentioned limit is reached (in terms of time, number of iterations, or RAM occupation fraction), the exploration strategy is changed in order to apply the "maximum area" criterion.

This criterion advantageously tends towards selecting nodes for which the partial plan is close to the complete cutting plan, by selecting partial plans with the greatest area of pieces that have already been placed. This makes it possible to reach complete cutting plans more quickly, and to improve the best complete cutting plan that has been obtained so far.

In order to save on memory space, in a particular implementation, only the leaf associated with the complete cutting plan that maximizes the optimization criterion is stored, the other leaves being deleted. In other words, the first leaf to be obtained is stored, and when a new leaf is obtained, only the leaf associated with the better complete cutting plan is retained in memory.

In a particular implementation, the method includes a step of deleting the nodes of the tree that are associated with partial cutting plans for which the acquired scrap area is greater than the area lost from a complete cutting plan associated with a said leaf.

This implementation may advantageously be combined with the above-described implementation that alternates between the "minimum scrap criterion" and the "maximum area criterion".

Specifically, if a better complete cutting plan is obtained, then a pruning operation is performed on all of the current nodes in an attempt to delete unpromising nodes that cannot make it possible to reach a better complete cutting plan. This is done by comparing the geometrical loss of a node that has not yet been explored with the loss of the best solution obtained so far; in other words, if the loss of a node is greater than the loss of the best node, then that node is deleted. This makes it possible to reduce the number of nodes that remain to be explored, thereby releasing memory. This criterion is also applied for a certain length of time or a predefined number of iterations, and then the "minimum scrap" criterion is applied once more in order to create new promising nodes.

The procedure consists in alternating between these two criteria, i.e. in alternating between creating new promising nodes and in obtaining improved new solutions that enable less-promising nodes to be deleted.

This concept of "acquired scrap" is summarized together with other concepts with reference to FIG. 7, which shows a partial cutting plan PDP.

In this partial plan, it is known to define three types of area, namely:

the useful area containing pieces, which in this figure are numbered with the number of the frame for which they are intended;

acquired scrap (shaded), i.e. area that is unused and in which it is not possible to add any new piece; and the area (stippled) that can still be used for placing subsequent additional pieces (pale gray).

Thus, in a particular implementation, when it is determined that a node of the tree is associated with a partial cutting plan for which the acquired scrap area is already greater than the lost area of a complete cutting plan, it is known that this node can be deleted since there are no circumstances in which it can give rise to a complete cutting plan that offers a better solution.

This particular implementation makes it possible to prune the tree and to reduce considerably the execution time of the method.

In a particular implementation, the optimization method of the invention avoids or minimizes creating nodes in the tree that corresponded to partial cutting plans that are isomorphic, i.e. cutting plans comprising the same pieces and presenting the same acquired scrap area. By way of example, the partial cutting plans PDPA and PDBP of FIG. 9 are isomorphic.

Thus, in a particular implementation, said positioning constraints include at least one lexicographic constraint relating to a number of said frames in order to avoid or to minimize creating nodes that correspond to partial cutting plans that are isomorphic.

For example, the positioning constraints may include two lexicographic rules, according to which:
- if the last piece is placed above the preceding piece, the frame number of the last piece must be less than the frame number of the preceding piece;
- if the last piece is placed to the right the preceding piece, the frame number of the last piece must be greater than or equal to the frame number of the preceding piece.

In a particular implementation, each time a node is created, the node is classified as a function of at least one characteristic of the cutting plan represented by that node, this or these characteristics being sufficient for selecting the complete cutting plan.

This characteristic is preferably the characteristic used during said step of selecting the current node of the tree in the optimized implementation variant.

This implementation can avoid the need to scan once more through the entire tree in order to select the optimized complete cutting plan and in order to select the current node in the optimized implementation variant.

In a particular implementation, the other nodes of the tree, including its leaves, are represented in memory by the frame number of the last piece to be placed, and by the direction in which it was placed.

This implementation serves to minimize memory occupation.

The invention also provides a device for determining an optimized cutting plan for using a guillotine to cut a batch of rectangular pieces of glass out from at least one sheet of glass, the pieces, once cut out, being for stacking on at least one frame, the pieces for any one frame being for placing on a sheet for cutting in a sequence that is predetermined for that frame, said device comprising:
- an initialization module for defining cutting constraints and positioning constraints for the pieces together with an optimization criterion;
- a module for creating a tree comprising a root, leaves, each presenting a complete cutting plan enabling all of the pieces of the batch to be cut out, each other node of the tree representing a partial cutting plan, the cutting plan associated with a node of the tree being obtained by adding to the partial cutting plan associated with the parent node of said node, and in compliance with the constraints, the next piece for a frame determined in compliance with the sequence predetermined for the frame; and
- a selection module for selecting a complete cutting plan associated with a leaf of the tree as a function of said optimization criterion.

The cutting plans obtained by the method of the invention may be used in particular:
- for creating optimized cutting batches upstream from the cutting line;
- during cutting proper, where cutting consists mainly in propagating cracks across the glass, in an order that complies with the cutting plan; and
- for assisting the operator while breaking the sheet of glass in order to obtain pieces that are to be placed on the various frames.

Consequently, the invention also provides a cutting method for using a guillotine to cut a batch of rectangular pieces of glass out from at least one sheet of glass, the method being characterized in that it comprises:
- performing a method of determining an optimized cutting plan as mentioned above;
- said optimized plan being used during a stage of cutting said sheet and during a stage of breaking said sheet.

In a particular implementation of this method, the batch is itself determined by performing a method of determining an optimized cutting plan as described above.

In a particular implementation, the various steps of the method of determining an optimized cutting plan of the invention are determined by computer program instructions.

Consequently, the invention also provides a computer program on a data medium, the program including instructions adapted to performing steps of a method of determining an optimized cutting plan of the invention.

The program may use any programming language, and it may be in the form of source code, object code, or code intermediate between source code and object code, such as in a partially compiled form, or in any other desirable form.

The invention also provides a computer readable data medium, including instructions of a computer program as mentioned above.

The data medium may be any entity or device capable of storing the program. For example, the medium may comprise storage means, such as a read only memory (ROM), e.g. a compact disk (CD) ROM or a microelectronic circuit ROM, or indeed magnetic recording means, e.g. a hard disk.

Furthermore, the data medium may be a transmissible medium such as an electrical or optical signal that can be conveyed via an electrical or optical cable, by radio, or by other means. The program of the invention may in particular the downloaded from a network of the Internet type.

Alternatively, the data medium may be an integrated circuit in which the program is incorporated, the circuit being adapted to execute or to be used in the execution of the method in question.

BRIEF DESCRIPTION OF THE DRAWINGS

Other characteristics and advantages of the present invention appear from the following description made with reference to the accompanying drawings, which show an implementation having no limiting character. In the figures:

FIGS. 2A and 2B show complete cutting plans suitable for cutting out all of the pieces on the frames of FIG. 1;

FIG. 7, described above, shows a partial cutting plan;

FIG. 9, described above, shows partial cutting plans that are isomorphic.

DETAILED DESCRIPTION OF A FIRST IMPLEMENTATION OF THE INVENTION

Figure 1:
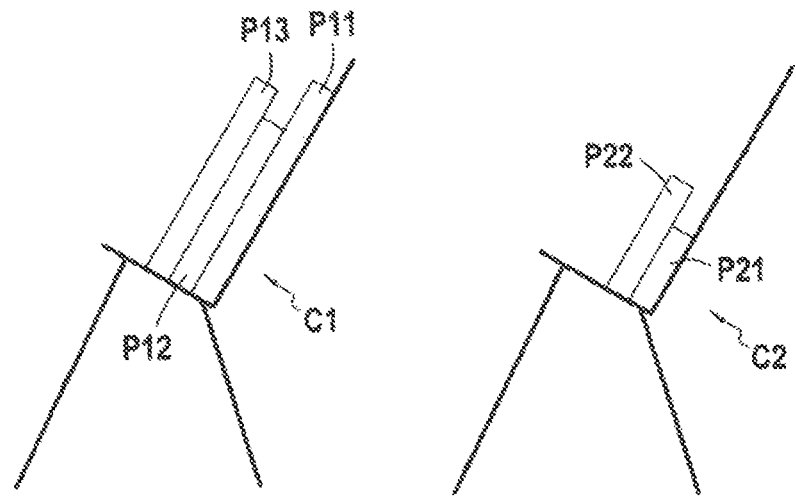
FIG. 1 shows frames carrying pieces of glass.

With reference to FIG. 1, there follows a description of the invention being performed in a first particular implementation of the invention in order to determine an optimized plan for cutting out a batch of five rectangular pieces of glass P11, P12, P13, P21, and P22 by guillotine, which pieces of glass are to be stacked on two frames C1 and C2, the plan needing to comply with a certain number of constraints while minimizing cutting losses.

Figure 10:
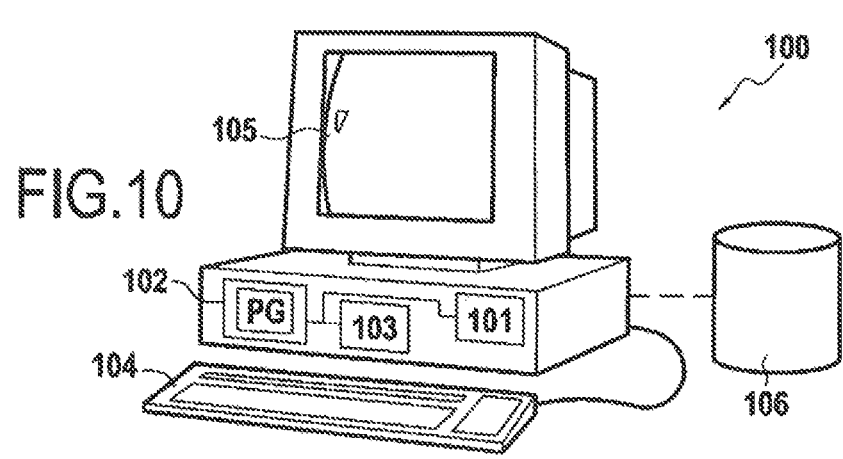
FIG. 10 is a diagram showing the hardware architecture of a determination device in accordance with a particular embodiment of the invention.

The method may be performed by the determination device 100 in accordance with the invention as shown in FIG. 10. The device presents the hardware architecture of a computer. In particular, it comprises a processor 101, a ROM 102, a random access memory (RAM) 103, a keyboard 104, a screen 105, and a hard disk 106.

The ROM 102 constitutes a medium in the meaning of the invention. It includes a computer program PG including instructions for executing steps of the method of the invention for determining an optimized cutting plan.

Figure 3:
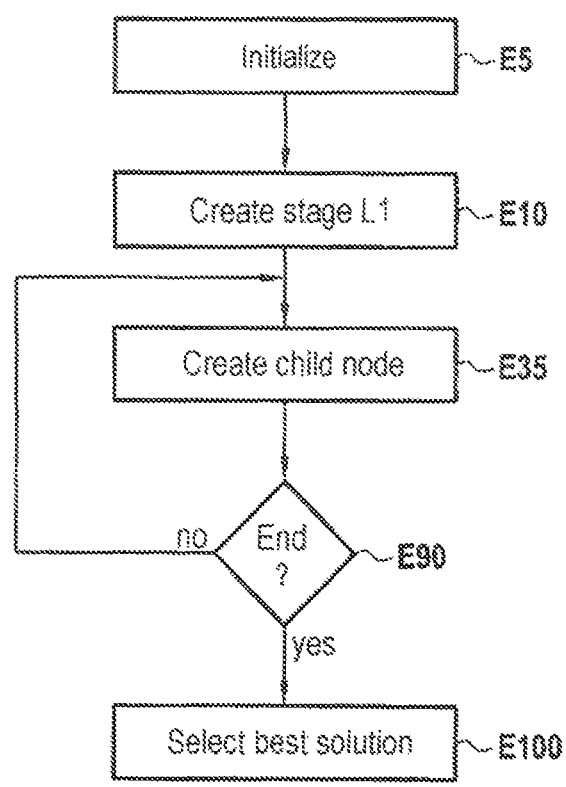
FIG. 3 is a flow chart showing the main steps of a determination method in accordance with a first particular implementation of the invention.

In this example, the program PG contains instructions for executing steps as shown in FIG. 3.

The program serves to determine an optimized plan for cutting the pieces P11 to P22 by guillotine out from at least one sheet of glass.

The program includes an input module enabling the operator to use the keyboard or any other means to give the device 100 the cutting constraints and positioning constraints for the pieces together with an optimization criterion. This data may be stored on the hard disk 106.

The program also has a creation module for creating a tree having a root, leaves, each of which represents a complete cutting plan suitable for cutting out all of the pieces of the batch, with each other node of the tree representing a partial cutting plan, the cutting plan associated with a node of the tree being obtained by adding to the partial cutting plan associated with the parent node of that node, and in compliance with said constraints, the next piece for a said frame determined in the sequence predetermined for that frame.

In the presently-described implementation, the nodes of the tree are stored in the RAM 103.

The program PG also has a selector module for selecting a complete cutting plan associated with a leaf of the tree as a function of the optimization criterion stored on the hard disk 106.

In the presently-described implementation, open nodes, i.e. nodes representing partial cutting plans for which extension by a piece has not been investigated, are stored in a buffer in RAM.

Figure 8:
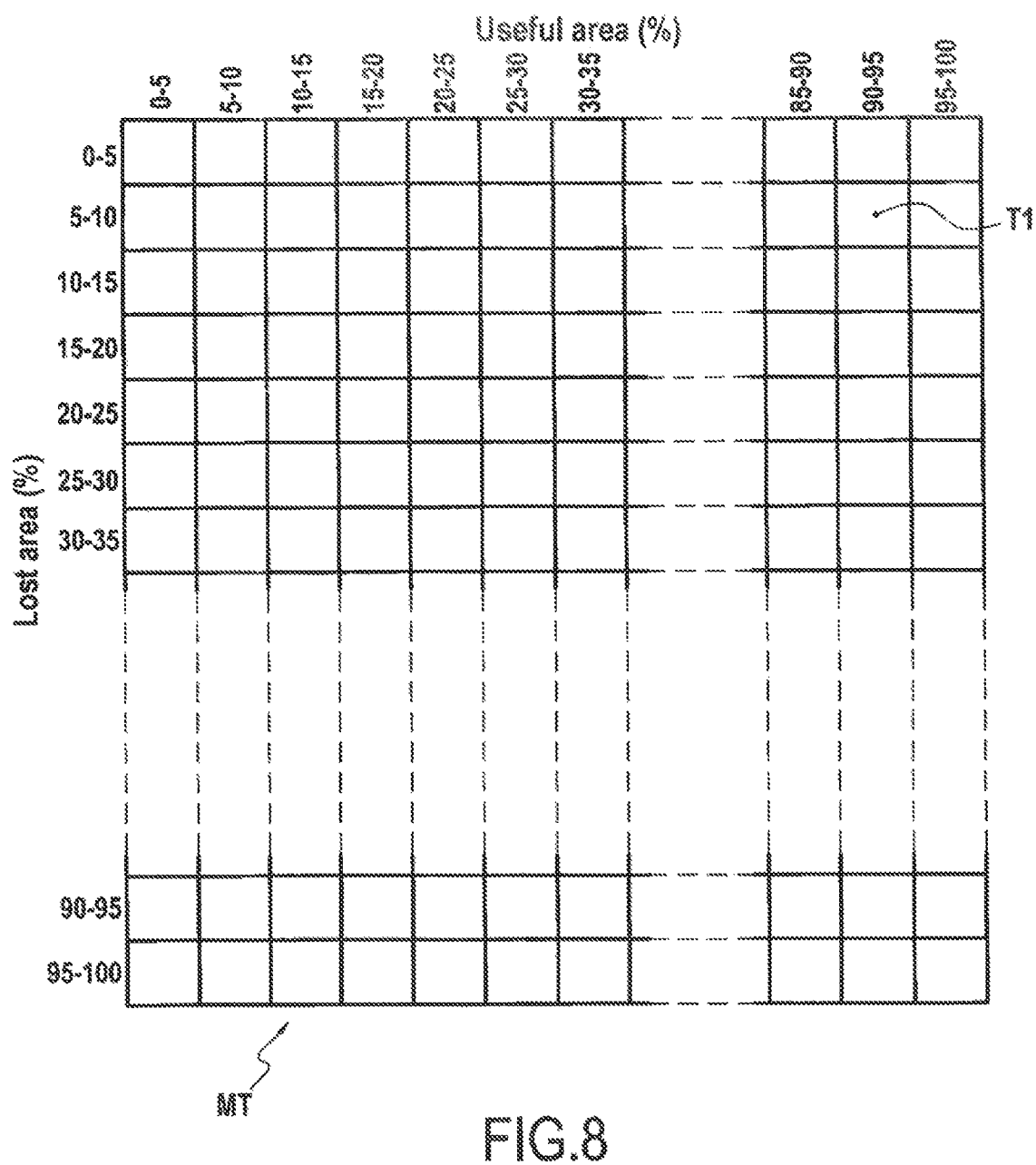
FIG. 8 shows a buffer memory for storing nodes associated with the partial cutting plan in a particular implementation of the invention.

In the presently-described implementation, and as shown in FIG. 8, the buffer memory is organized in the form of a two-input table MT, in which:

the rows serve to classify nodes by percentage area loss from the associated cutting plan; and the columns serve to classify nodes by the percentage useful area of the associated cutting plan.

In the example of FIG. 8, the table has 20 rows and 20 columns, in other words an increment of 5%. The value of this increment can be varied and may differ between the rows and the columns.

Thus, by way of example, a node associated with a partial cutting plan presenting 91% of useful area and 6% of area loss would be stored in box T1.

The table is updated each time a node is created.

In the presently-described implementation, each open node is characterized by:

a table indicating which is the next available piece in each frame;

the left and right positions of the right-most guillotine 1, written respectively x1$l$ and x1$r$ in FIG. 7;

the floor and ceiling positions of the topmost guillotine 2, written respectively y2$f$ and y2$c$;

the right position of the last-placed piece, written x3; and the top position of the last-placed piece, written y4.

A closed node is represented in memory by the frame number of the last-placed piece, and the direction in which it was placed.

In the presently-described implementation, the positioning constraints require in particular:

the pieces P11, P12, and P13 to be placed in that order on the frame C1; and the pieces P21 and P22 to be placed in that order on the frame C2.

And the cutting constraints require:

a maximum of four levels of cutting;

a minimum width for scrap; and a maximum width for the breadths (or levels).

Figure 2A:
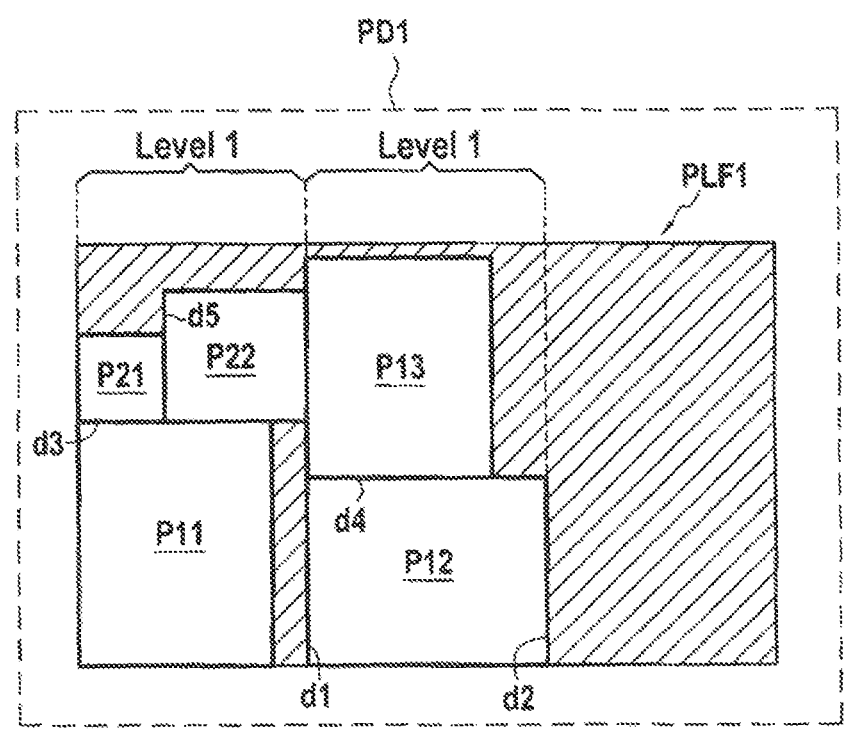

FIGS. 2A and 2B show two acceptable cutting plans PD1 and PD2, namely (FIG. 2A) a first cutting plan PD1 in which all of the pieces are situated on the same sheet PLF1, and a second cutting plan PD2 in which the pieces are placed on two sheets PLF2 and PLF3.

By way of example, in the cutting plan PD1 of FIG. 2A, there can be seen:

two level 1 cuts written d1, d2;

two level 2 cuts written d3, d4; and one level 3 cut written d5.

In this example, the cutting plan PD1 of FIG. 2A is preferred over the cutting plan PD2 of FIG. 2B since it minimizes the area of scrap that is generated, as represented by shading.

FIG. 3 shows the main steps of a method in accordance with a first implementation of the invention for optimizing the cutting of glass.

With reference to this figure, the method comprises a step E5 of defining cutting constraints and positioning constraints for said pieces together with an optimization criterion. This step serves to initialize the method with:

the number of frames, specifically two;

the order of the pieces P11-P13 and P21-P22 on these frames;

the dimensions of each of the pieces;

the dimensions of the sheets;

the maximum number of cutting levels, specifically four;

the minimum width of scrap;

the maximum width of the breadths; and the optimization criterion.

The initialization step E10 is followed by a creation step E10 of creating the first stage L1 of the tree T of the cutting plan.

It should be recalled that in accordance with the invention, the complete cutting plans are represented by the leaves of the tree, the parent nodes of leaves representing complete cutting plans themselves representing partial cutting plans PDP enabling the complete cutting plans to be reached.

Thus, in accordance with the invention, starting from the root of the tree T, each (child) node is obtained from the preceding (parent) node by adding to the partial cutting plan represented by the parent an additional piece, while complying with the positioning and cutting constraints.

The set of acceptable partial plans at the first stage L1 of the tree T is constituted by the set of partial plans that can be obtained by placing the first piece of each of the frames C1 or C2, namely the piece P11 or the piece P21, in a corner of a sheet of glass.

Figure 4:
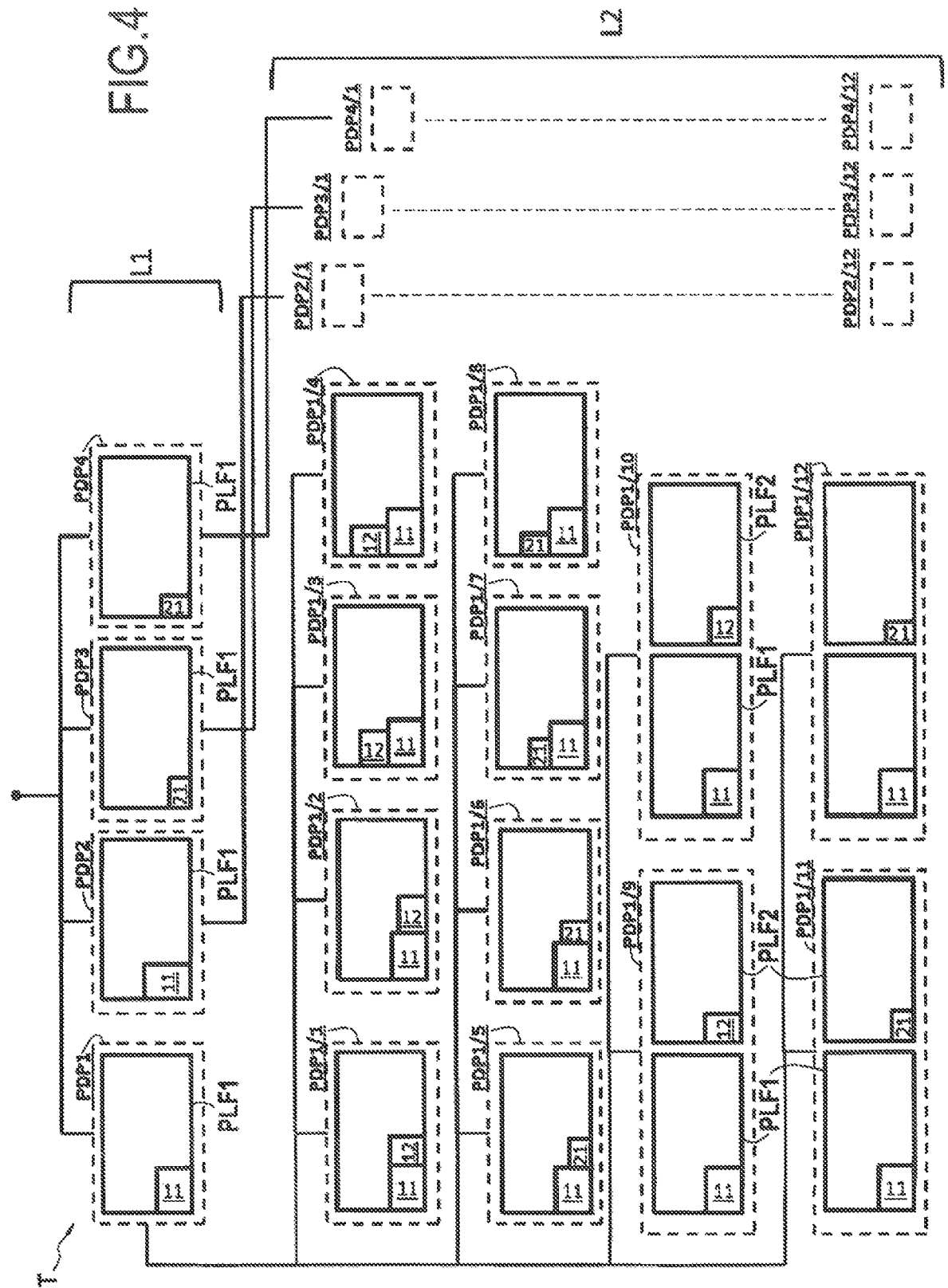
FIG. 4 shows partial cutting plans that can be obtained by the invention.

As shown in FIG. 4, this produces four partial cutting plans PDP1 to PDP4 in which the piece P11 or P21 is positioned and in which the piece is placed either horizontally or vertically. At the first stage L1, each of the partial cutting plans (represented by dashed lines) has only one glass sheet PLF1 (represented by continuous lines).

During a step E35, the child nodes of each of the nodes in stage L1 are created, these nodes constituting a stage L2 of the tree T.

In FIG. 4, the child nodes PDP1/1 to PDP1/12 of the node PDP1 are shown in detail, while the child nodes PDP2/1 to PDP4/12 of the nodes PDP2 to PDP4 are only symbolized.

The partial cutting plans PDP1/i are obtained from the partial cutting plan PDP1:
  by considering that the pieces that have been positioned in the partial plan PDP1 have been unstacked from the frames; and
  by considering all of the cutting plans that could be obtained by adding to the cutting plan PDP1 each of the pieces against the frames C1, C2 considered while complying with the positioning and cutting constraints.

In the example of FIG. 4, the pieces against the frames C1 and C2 at the end of the partial cutting plan PDP1 of the piece 12 for the frame C1 and the piece 21 for the frame C2. In this example, the acceptable cutting plans that can be obtained from the partial plan PDP1 by positioning the piece 12 or the piece 21 are as follows:
  the cutting plan PDP1/1 obtained by placing the piece 12 to the right of the piece 11 in a vertical position, this plan having only one sheet PLF1;
  the cutting plan PDP1/2 obtained by placing the piece 12 to the right of the piece 11 in the horizontal position, this plan having only one sheet PLF1;
  the cutting plan PDP1/3 obtained by placing the piece 12 on the piece 11 in the horizontal position, this plan having only one sheet PLF1;
  the cutting plan PDP1/4 obtained by placing the piece 12 on the piece 11 in the vertical position, this plan including only one sheet PLF1;
  the cutting plan PDP1/5 obtained by placing the piece 21 to the right of the piece 11 in the horizontal position, this plan including only one sheet PLF1;
  the cutting plan PDP1/6 obtained by placing the piece 21 to the right of the piece 11 in the vertical position, this plan including only one sheet PLF1;
  the cutting plan PDP1/7 obtained by placing the piece 21 on the piece 11 in the horizontal position, this plan including only one sheet PLF1;
  the cutting plan PDP1/8 obtained by placing the piece 12 on the piece 11 in the vertical position, this plan including only one sheet PLF1;
  the cutting plan PDP1/9 obtained by creating a new sheet PLF2 including the piece 12 in the vertical position PLF;
  the cutting plan PDP1/10 obtained by creating a new sheet PLF2 including the piece 12 in the horizontal position;
  the cutting plan PDP1/11 obtained by creating a new sheet PLF2 including the piece 21 in the horizontal position; and
  the cutting plan PDP1/12 obtained by creating a new sheet PLF2 including the piece 21 in the vertical position.

In this example, the stage L2 also includes:
  all of the acceptable partial cutting plans PDP2/1 to PDP2/12 that can be obtained by adding the piece 12 or 21 to the partial cutting plan PDP2;
  all of the acceptable partial cutting plans PDP3/1 to PDP3/12 that can be obtained by adding the piece 11 or 22 to the partial cutting plan PDP3; and
  all of the acceptable partial cutting plans PDP4/1 to PDP4/12 that can be obtained by adding the piece 11 or 22 to the partial cutting plan PDP4.

By repeating this process in iterative manner until all of the frames C1 and C2 have been completely emptied of their pieces (test E90), a tree T having five stages is obtained, in which each of the leaves corresponds to a complete cutting plan satisfying the cutting and placement constraints. The complete cutting plans PD1 and PD2 of FIGS. 2A and 2B constitute some of these leaves.

The method in this first implementation includes a step E100 during which a selection is made from among all of the leaves of the tree T to obtain the complete cutting plan that minimizes the area of scrap.

This cutting plan serves to optimize the cutting of sheets of glass in order to make up the frames C1 and C2.

DETAILED DESCRIPTION OF A SECOND IMPLEMENTATION

When batches are complex, the calculation time needed for creating the complete tree T in accordance with the first implementation of the invention can be excessively long.

In a second particular implementation of the invention, described below with reference to FIG. 5, the total duration for which the method is executed is limited and creating all of the nodes of the tree is abandoned by selecting, on each iteration, from among the nodes of the tree that have already been created, a current node that represents a promising partial cutting plan for which child nodes are created.

Figure 5:
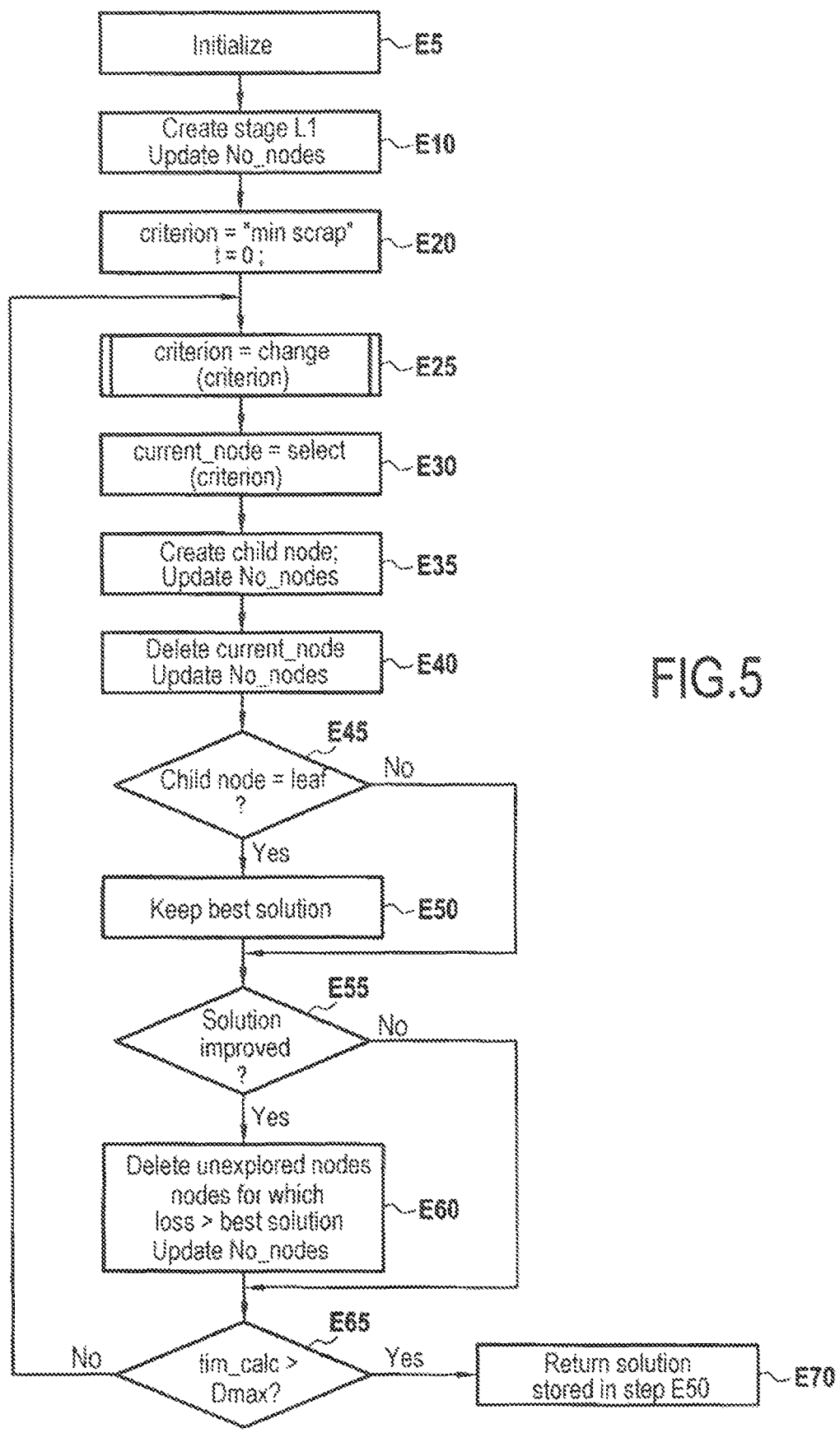
FIG. 5 is a flow chart showing the main steps of a determination method in accordance with a second particular implementation of the invention.

The method may be performed by the determination device 100 in accordance with the invention as shown in FIG. 10, however in this example the program PG contains instructions for executing the steps shown in FIG. 5.

In the presently-described implementation, each open node is also characterized by:
  the number of the frame, the placement direction, and the attitude of the last-placed piece;
  the parent node, which corresponds to the partial cutting plan without the last-placed piece; and
  a series of secondary attributes that are updated in order to guide the path through the tree, i.e. the acquired scrap, the occupied area of sheets, corresponding to the sum of the areas of the pieces in the partial plan for the geometrical losses, the number of sheets used, its position relative to the preceding piece (to the right or above).

In the presently-described particular implementation, the method has two selection criteria for selecting the promising partial cutting plan, namely:
  a "minimum scrap criterion", which consists in selecting from among all of the partial cutting plans that have already been created, the plan that has the smallest ratio of area loss divided by useful area; and a "maximum area criterion", which consists in selecting from among all of the partial cutting plans that have already been created, the plan for which the useful area is the greatest.

In the presently-described implementation, after creating the first stage L1 (see step E10 of the first implementation), the selection criterion is initialized during a step E20 to the "minimum scrap criterion". During this same step E20, a time count is initialized with zero.

In the presently-described implementation, each iteration includes a general step E25 during which it is verified whether it is appropriate to change the selection criterion.

Figure 6:
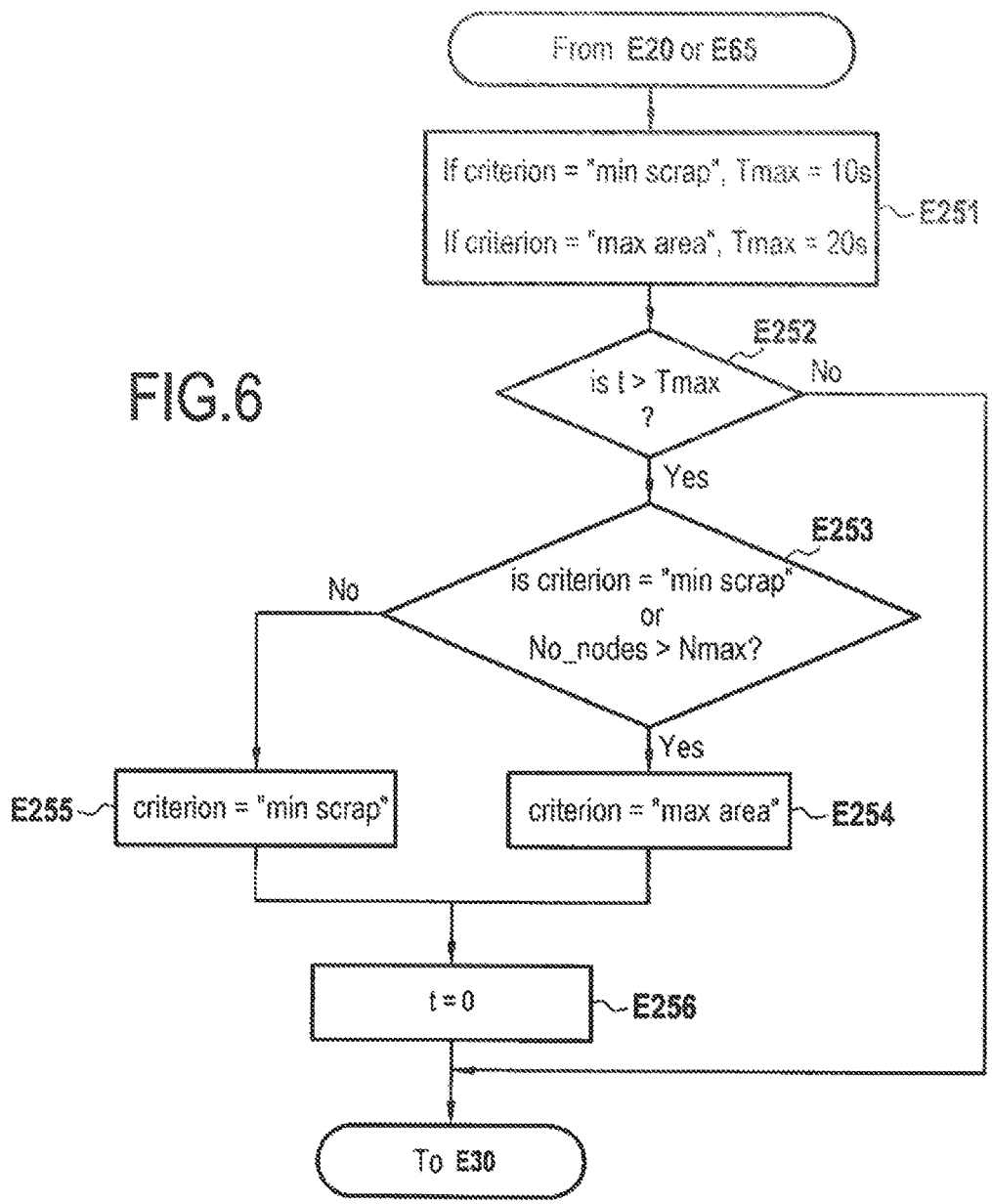
FIG. 6 is a flow chart showing the main steps of an optimization function performed by the FIG. 5 determination method.

This step is described with reference to FIG. 6 in a particular implementation of the invention.

During a step E251, a value TMAX is initialized as a function of the current selection criterion. In this example, if the current selection criterion is the "minimum scrap criterion", then TMAX equals 10 seconds (s), and if the current selection criterion is the "maximum area criterion", then TMAX is equal to 20 s.

During a step E252, it is verified whether the time count t as initialized in step E20 is greater than its duration TMAX. If not, then the general step E25 terminates without changing the selection criterion and without reinitializing the time count t.

If the time count is greater than the duration TMAX, then in step E253, it is determined which selection criterion should be used for selecting the next node for which child nodes are to be created. In the presently-described implementation:

the "maximum area criterion" is retained (step E254) if the current criterion is the "minimum scrap criterion" or if the number of nodes of the tree T is greater than a predefined value NMAX. For this purpose, in this implementation, a global variable No_nodes is used that stores in the RAM 103 the number of nodes of the tree T, this variable having the value 4 in this example at the end of the step E10 of creating the first stage L1; else otherwise the "minimum scrap criterion" is retained (step E255).

The time count t is reinitialized to zero during a step E256, and the general step E25 for changing criterion terminates.

Returning to FIG. 5, during a step E30, a selection is made from among the nodes of the tree that have already been created, to obtain a current node as a function of the selection criterion retained in step E25:

if the selection criterion is the "minimum scrap criterion", the node of the tree that is selected is the node for which the cutting plan has the smallest ratio of area loss divided by useful area. In the particular implementation of FIG. 8, this amounts to selecting the node that is stored in the highest box of the table. If several possibilities are available, then a node is selected from the box that is furthest to the right (maximum useful area percentage);

if the selection criterion is the "maximum area criterion", then the node of the tree that is selected represents the cutting plan for which the useful area is the greatest. In the particular implementation of FIG. 8, this amounts to selecting a node stored in a box that is the furthest to the right in the table. If a plurality of possibilities are available, then a node is selected in a highest box (minimum percentage of area loss).

During a step E35, the child nodes are created for the current node. This step is identical to the step E35 described with reference to FIG. 3. During this same step, attributes are calculated and stored for each of the nodes that are created and the No_nodes variable representative of the number of nodes in the tree is updated.

In this implementation, the current node is deleted during a step E40.

During a step E45, it is verified whether one or more of the nodes created in step E35 are leaves of the tree, in other words whether they contain all of the pieces of the frames.

If so, in a step E50, the leaf that that is associated with the complete cutting plan that corresponds to the best solution that has been obtained so far is stored in memory, i.e. in this example, the node that minimizes the area of scrap. The other leaves may be deleted. When a first leaf is obtained, this leaf if stored in memory.

During a step E55, it is verified whether a leaf obtained in step E35 corresponds to an improved solution, and if so, during a step E60, all of the acquired nodes having areas of scrap greater than the area loss for this leaf are deleted from the tree T.

In the presently-described implementation, the optimization method includes a step E65 during which it is verified that the total duration of execution of the method has not exceeded a predefined duration DMAX, e.g. one hour. For this purpose, it is possible to use a global time count tim_calc that is initialized in step E5.

If in step E65 it is determined that the duration DMAX has not been reached, the method continues by looping back to step E25 of determining the selection criterion for the next node.

When it is determined that the duration DMAX has been reached, in step E70, the method returns the complete cutting plan that corresponds to the best solution stored in step E50.

DETAILED DESCRIPTION OF A THIRD IMPLEMENTATION in a particular implementation, the optimization method of the invention avoids or minimizes creating nodes in the tree T that correspond to partial cutting plans that are isomorphic, i.e. cutting plans that include the same pieces, that present the same acquired areas of scrap, and the same values for x1*l*, x3, x1*r*, y2*f*, y4, and y2*c*.

In this presently-described third implementation, at each node creation step E35, prior to creating a node, it is ensured that the node does not represent a partial or complete cutting plan that is isomorphic with a cutting plan associated with a node that has already been created in the tree.

To do this, in the presently-described implementation, lexicographic rules are added to the positioning constraints. For example, the following two rules may be added:

if the last piece is placed above the preceding piece, the frame number of this last piece must be less than the frame number of the preceding glass; and if the last piece is placed to the right of the preceding piece, then the frame number of this last piece must be greater than or equal to the frame number of the preceding piece.

In order to reduce the risk of conserving cutting plans that are isomorphic, it is also possible by way of example to decide to open a new level 1 only if at least one of the following two conditions is satisfied:

condition 1: the K preceding levels 1 include at least one piece to be placed on the same frame. For example, in the context of FIG. 2A, with K=2, the pieces of the two preceding levels 1 are respectively {P11, P21, P22} and {P12, P13}; consequently, each of these levels 1 includes at least one piece of the frame C1 so condition 1 is satisfied; and condition 2: the order of the frames from the last-placed piece for the last Q levels 1 is increasing. By way of example, in the context of FIG. 2A, with Q=2, the last-placed piece in the two levels 1 are respectively P22 and P13; the frames (C2, C1) are in decreasing order, so condition 2 is not satisfied.

The invention claimed is:

1. A method of cutting a batch of rectangular pieces of glass out from at least one sheet of glass, said method comprising:
    determining an optimized cutting plan to cut the batch of pieces of glass out from the at least one sheet of glass for stacking on at least one frame, the determining including initializing by defining cutting constraints and positioning constraints for said pieces of glass together with an optimization criterion;
    creating a tree comprising a root and leaves, each tree presenting a complete cutting plan enabling all of the pieces of said batch to be cut out, each other node of the tree representing a partial cutting plan, the partial cutting plan associated with a node of the tree being obtained by adding to the partial cutting plan associated with a parent node of said node of the tree, and in compliance with said cutting constraints and positioning constraints, a next piece for said at least one frame determined in compliance with a sequence predetermined for the at least one frame;
    selecting a complete cutting plan associated with a leaf of the tree as a function of said optimization criterion;
    cutting the batch of rectangular pieces of glass out from the at least one sheet of glass based on the selected complete cutting plan; and
    stacking the cut pieces on the at least one frame, the pieces for any one frame are placed on the at least one sheet of glass that is to be cut up based on the sequence that is predetermined for that frame,
    wherein creating the tree comprises:
    creating, under said root and for each of said at least one frame, a node associated with a partial cutting plan for each of the acceptable positions of the first piece of said at least one frame while complying with said cutting constraints and positioning constraints; and
    at least one iteration, each iteration comprising:
        selecting a current node of the tree as a function of characteristics of the partial cutting plan represented by the selected current node; and
    creating at least one child node of said current node, the cutting plan associated with said child node being obtained by adding to the partial cutting plan associated with said current node, and while complying with said cutting constraints and positioning constraints, the next piece of said at least one frame taken in accordance with the sequence predetermined for that at least one frame.

2. The method according to claim 1, wherein the optimization criterion is selected from at least one of:
    a criterion seeking to minimize the number of sheets of glass used; and
    a criterion seeking to minimize the total area lost as generated by cutting.

3. The method according to claim 1, wherein said cutting constraints are selected from at least one of:
    a maximum number of cutting levels;
    a minimum width of scrap;
    a maximum width of a cutting level; and
    a direction for a first break.

4. The method according to claim 1, wherein said positioning constraints include at least one of orientations of the pieces in a sheet, and relative positions of the pieces in a single sheet as a function of their level, and a maximum number of said at least one sheet of glass.

5. The method according to claim 1, wherein a node of the tree possesses a maximum of 9.m child nodes, where m is the number of frames, a new piece being selectable for each frame while complying with the positioning constraints of that frame and is configured to be added to a partial cutting plan in nine different manners, namely:
    to the right of the preceding piece in a cutting level 3, either horizontally or vertically;
    above the preceding piece if these last two pieces have a same width in a new cutting level 4, a single position suffices among horizontal and vertical, namely the position of width that is equal to the width of the preceding piece;
    above the preceding piece, at the left end of the current breadth in a new cutting level 2, either horizontally or vertically;
    in a new breadth in a new cutting level 1, either horizontally or vertically; and
    in a new sheet, either horizontally or vertically.

6. The method according to claim 1, further comprising stopping said at least one iteration if a duration of execution of the method is greater than a predefined duration.

7. The method according to claim 1 wherein said current node is selected:
    in compliance with a first criterion referred to as a minimum scrap criterion consisting in selecting the node associated with the cutting plan having the smallest ratio of the area lost divided by the total area occupied by the pieces of said plan; or
    in compliance with a second criterion referred to as a maximum area criterion consisting in selecting the node associated with the cutting plan having the largest useful area.

8. The method according to claim 1, wherein each time a node is created, said node is classified as a function of at least one characteristic of the cutting plan represented by the node, said at least one characteristic being sufficient for selecting said complete cutting plan, and said at least one characteristic used for classification is said at least one characteristic used during said step of selecting the current node of the tree.

9. The method according to claim 1, further comprising storing only the leaf associated with the complete cutting plan that maximizes said optimization criterion, and deleting the other leaves.

10. The method according to claim 1, further comprising deleting the nodes of the tree that are associated with partial cutting plans for which an acquired scrap area is greater than an area lost from a complete cutting plan associated with said leaf.

11. The method according to claim 1, wherein said positioning constraints include at least one lexicographic constraint relating to a number of said at least one frame in order to avoid or to minimize creating nodes that correspond to partial cutting plans that are isomorphic.

12. The method according to claim 1, wherein each time a node is created, said node is classified as a function of at least one characteristic of the cutting plan represented by the node, said at least one characteristic being sufficient for selecting said complete cutting plan.

13. A non-transitory computer readable medium storing a computer program including instructions for executing steps of the method according to claim 1 for determining an optimized cutting plan.

14. A cutting method for using a guillotine to cut a batch of rectangular pieces of glass out from at least one sheet of glass, the method comprising:
performing the method according to claim 1 for determining an optimized cutting plan; and
using said optimized cutting plan during a stage of cutting said sheet and during a stage of breaking said sheet.

15. The cutting method according to claim 14, wherein said batch is determined by determining an optimized cutting plan.

16. A device for determining an optimized cutting plan for using a guillotine to cut a batch of rectangular pieces of glass out from at least one sheet of glass, the pieces, once cut out, being for stacking on at least one frame, the pieces for any one frame being for placing on said at least one sheet for cutting in a sequence that is predetermined for the at least one frame, said device comprising:
circuitry configured to:
define cutting constraints and positioning constraints for said pieces together with an optimization criterion;
create a tree comprising a root and leaves, each tree presenting a complete cutting plan enabling all of the pieces of said batch to be cut out, each other node of the tree representing a partial cutting plan, the partial cutting plan associated with a node of the tree being obtained by adding to the partial cutting plan associated with a parent node of said node, in compliance with said cutting constraints and positioning constraints, a next piece of said at least one frame determined in compliance with the sequence predetermined for the at least one frame;
select a complete cutting plan associated with a leaf of the tree as a function of said optimization criterion; and cut, using the guillotine, the batch of rectangular pieces of glass out from the at least one sheet of glass based on the selected complete cutting plan,
wherein creating the tree comprises:
creating, under said root and for each of said at least one frame, a node associated with a partial cutting plan for each of the acceptable positions of the first piece of said at least one frame while complying with said cutting constraints and positioning constraints; and
at least one iteration, each iteration comprising:
selecting a current node of the tree as a function of characteristics of the partial cutting plan represented by the selected current node; and
creating at least one child node of said current node, the cutting plan associated with said child node being obtained by adding to the partial cutting plan associated with said current node, and while complying with said cutting constraints and positioning constraints, the next piece of said at least one frame taken in accordance with the sequence predetermined for that at least one frame.

* * * * *